United States Patent [19]

Noso et al.

[11] Patent Number: 5,029,018

[45] Date of Patent: Jul. 2, 1991

[54] STRUCTURE OF IMAGE PROCESSING SYSTEM

[75] Inventors: Kazunori Noso; Kiyoshi Akutagawa, both of Kanagawa, Japan

[73] Assignee: Nissan Motor Company, Limited, Japan

[21] Appl. No.: 272,996

[22] Filed: Nov. 17, 1988

[30] Foreign Application Priority Data

Nov. 18, 1987 [JP] Japan .................................. 62-289288
Nov. 18, 1987 [JP] Japan .................................. 62-289290

[51] Int. Cl.$^5$ ............................................. H04N 1/40
[52] U.S. Cl. ................................... 358/448; 358/444; 358/468
[58] Field of Search ............... 353/443, 444, 445, 448, 353/468

[56] References Cited

U.S. PATENT DOCUMENTS 4,727,423 2/1988 Kameko et al. ..................... 358/448
4,891,633 1/1990 Imazeki ............................... 358/425

FOREIGN PATENT DOCUMENTS

0232641A2 8/1987 European Pat. Off. .
61-53774 7/1986 Japan .
WO87/04826 8/1987 World Int. Prop. O. .

Primary Examiner—Edward L. Coles, Sr.
Attorney, Agent, or Firm—Lowe, Price, LeBlanc & Becker

[57] ABSTRACT

A structure of an image processing system is disclosed in which a common bus, a plurality of image memories (VRAMs), and a plurality of data processors are installed and in which a plurality of selectors connected between each bus line of the common bus and each input end of the image memories and between each bus line of the common bus and each input end of the data processors are provided so that each selector is capable of selecting at least any one of the respective bus lines of the common bus to connect to the corresponding input end of the image memories and data processors. Therefore, data transfer between different addresses becomes possible via the common bus and simultaneous executions of calculation processings of the image data become possible. Consequently, flexibility and general-purpose utility of the system and extension of the image memories and data processors can be achieved.

21 Claims, 7 Drawing Sheets

FIG. 8 (A)

| | i-1 | i | i+1 | i+2 |
|---|---|---|---|---|
| j-1 | I | H | G | γ |
| j | F | E | D | β |
| j+1 | C | B | A | α |

FIG. 8 (B)

| α $(X_{i+2, j+1})$ | β $(X_{i+2, j})$ | γ $(X_{i+2, j-1})$ |
|---|---|---|
| A $(X_{i+1, j+1})$ | B $(X_{i, j+1})$ | C $(X_{i-1, j+1})$ |
| D $(X_{i+1, j})$ | E $(X_{i, j})$ | F $(X_{i-1, j})$ |
| G $(X_{i+1, j-1})$ | H $(X_{i, j-1})$ | I $(X_{i-1, j-1})$ |

STRUCTURE OF IMAGE PROCESSING SYSTEM

BACKGROUND OF THE INVENTION

1. Field of the Invention

The present invention relates to an improved structure of an image processing system and particularly relates to connections of common buses between a plurality of image memories and data processors which achieve high speed processings and can have general-purpose utilities.

2. Background of the Art

A previously proposed image processing system will be described below.

A common bus including two (X and Y) address bus lines and three data bus lines is connected to a plurality of image memories (VRAMs). A processor element is connected to the common bus for carrying out predetermined calculations for data read from one or the plurality of the image memories via the data bus line(s) and for writing (storing) a result of calculations into one of the other image memories. In addition, output buffers are connected between each output end of the image memories and processor element and data bus lines. Furthermore, an address controller for outputting address data to the respective image memories is connected to the address bus lines. The address controller controls the addresses of the image memories to scan them for each frame. A controller is provided to control entirely the processor element, address controller, and so on. A VRAM (Video Random Access Memory) controller controls the read and/or write of the respective image memories (VRAMs).

For example, in a processing case where the image data of the image memories are added by the processor element and the added image data is written in one of the other image memories, the data in the corresponding image memories inputted from the data bus lines are added in the processor element. Thereafter, its result is inputted into the data bus and the output data of the processor element may be written into the corresponding image memory. At this time, addresses of the image memories are scanned by means of the address controller for each frame (each image screen).

Such an image processing system as described above is exemplified by a Japanese Patent Application Publication (Unexamined) No. sho 61-153774 published on July 12, 1986.

In such a previously proposed image processing system, the addresses of the image memories are inputted only via the common bus (specifically address bus lines) and data to be processed by the processor element is inputted only via the common bus (specifically data bus lines).

Therefore, such processings as those required to execute calculations of the addresses of the image memories (for example, affine transformations) cannot be executed in the previously proposed image processing system. In addition, simultaneous executions of different processings cannot be carried out due to lack in flexibility of the structure of connections to the common bus as described above.

Furthermore, even if the installed number of processor elements and image memories is desired to be increased (extension of the system components) and the number of buses (bus lines) is increased, the previously proposed image processing system has less flexibility and less general-purpose utilities due to limitations of connections to the buses so that the high-speed and cost effective processings cannot be made.

SUMMARY OF THE INVENTION

It is an object of the present invention to provide an image processing system which is capable of high-speed and cost-effective processings of image data and which facilitates extensions of the image memories and processor elements into the image processing system with no limitation of connections to a common bus.

The above-described object can be achieved by providing a structure of an image processing system, comprising: (a) a common bus having at least two address bus lines and at least one data bus line; (b) a plurality of image memories each image memory capable of storing input image data and including two address input ends, data input end, and an output end; (c) a plurality of data processors capable of processing input image data to execute predetermined calculations and outputting executed data to the common bus, each data processor having at least two input ends and at least one output end connected to the common bus; (d) a plurality of selectors, connected between each bus line of the common bus and each input end of the image memories and connected between each bus line of the common bus and each input end of the data processors, each selector capable of selecting at least any one of the respective bus lines to connect to the corresponding input end of the image memories and the data processors; and (e) first means for controlling the image memories, data processors, and the selectors independently of each other so that a transfer of image data between different addresses of the image memories becomes possible for each image frame.

The above-described object can be achieved by providing a structure of an image processing system, comprising: (a) first means provided for commonly connecting each system component to transmit each address information and image data; (b) second means associated with the first means for storing address information and related image data transmitted via the first means; (c) third means associated with the first means for receiving address information and image data and processing the received address information and image data which are returned to the first means; (d) fourth means associated between the first means and second means for selectively inputting address information and image data into the second means; (e) fifth means associated between the first means and third means for selectively inputting the address information and image data into the third means; and (f) sixth means for controlling the second, third, fourth, and fifth means independently of each other so that a transfer of image data between different addresses becomes possible for each image frame.

BRIEF DESCRIPTION OF THE DRAWINGS

FIGS. 8 (A) and 8 (B) are explanatory views for explaining a relationship between each input pixel and X and Y addresses in a 3×3 spatial filtering operation.

DETAILED DESCRIPTION OF THE PREFERRED EMBODIMENTS

Reference will hereinafter be made to the drawings in order to facilitate understanding of the present invention.

Figure 1:
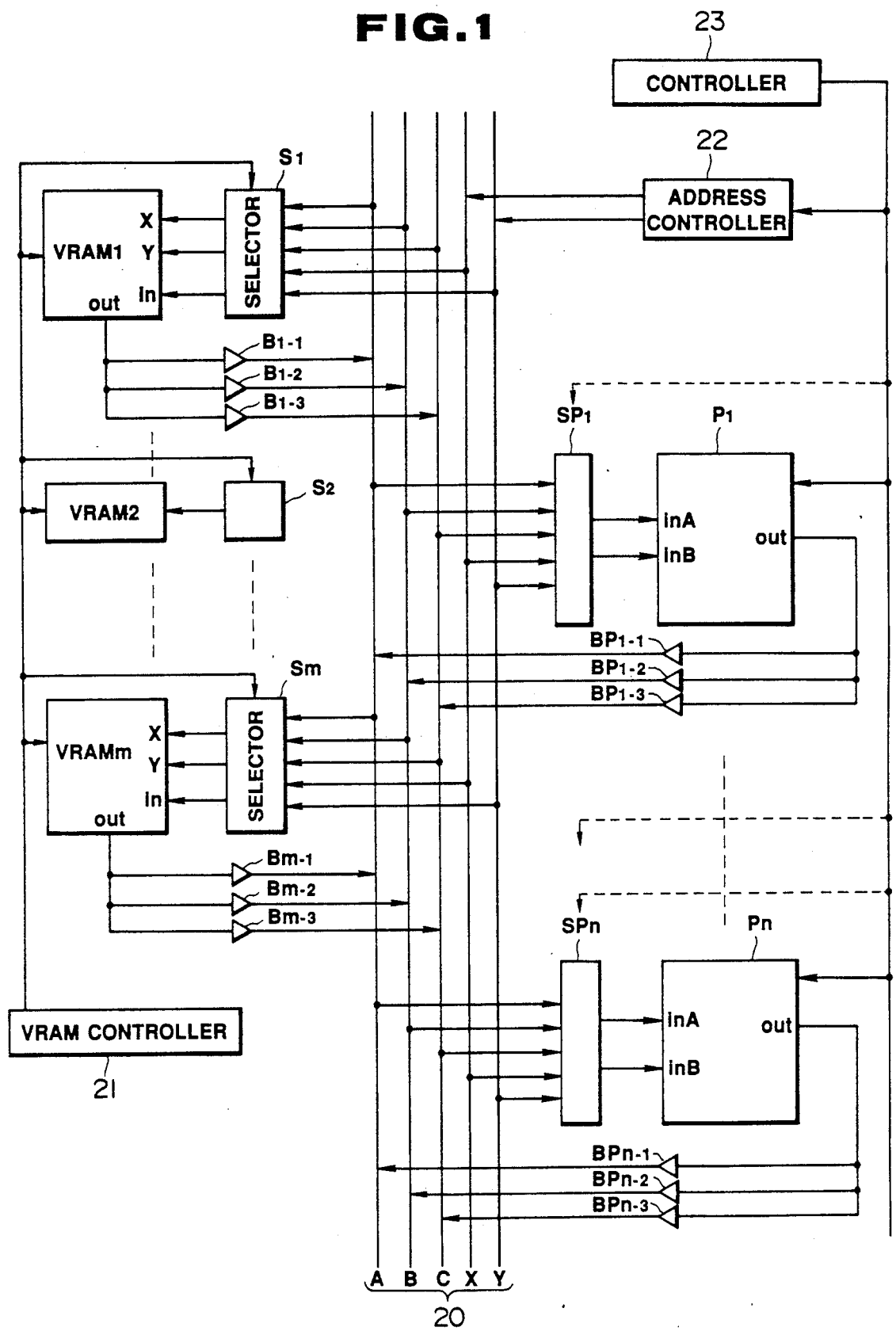
FIG. 1 is a circuit block diagram of an image processing system in a first preferred embodiment according to the present invention.

FIG. 1 shows a first preferred embodiment of an image processing system according to the present invention.

In FIG. 1, numeral 20 denotes a common bus including data buses A, B, and C and address buses X and Y.

Selectors $S_1$ to $S_m$ are installed between image memories VRAM (Video Random Access Memory) 1 to VRAM m and common bus 20, respectively. The selectors $S_1$ to $S_m$ select at least any one of the address bus X and data buses A, B, and C for an X address of the corresponding VRAM 1 to VRAM m and at least any one of address bus Y and data buses A, B, and C for the Y address of the corresponding VRAM 1 to VRAM m. The data input/output of the VRAM 1 to VRAM m selects any one of the data buses A, B, and C.

In addition, output buffers $B_{1-1}$ to $B_{m-3}$ are installed between respective output ends of the VRAM 1 to VRAM m and data buses A, B, and C. In FIG. 1 symbols $P_1$ to $P_n$ denote a plurality (number n) of processors, each executing a predetermined arithmetic/logic operation concerning image data. Each processor $P_1$ to $P_n$ has at least two input ends. Each processor $P_1$ to $P_n$ can selectively input data and address information from the common bus 20, i.e., data buses A, B, and C and address buses X and Y via the corresponding selectors $SP_1$ to $SP_n$.

Furthermore, the processors $P_1$ to $P_n$ have respective output ends for outputting processed data to any of data buses A, B, and C via corresponding output buffers $BP_{1-1}$ to $BP_{n-3}$.

Figure 2:
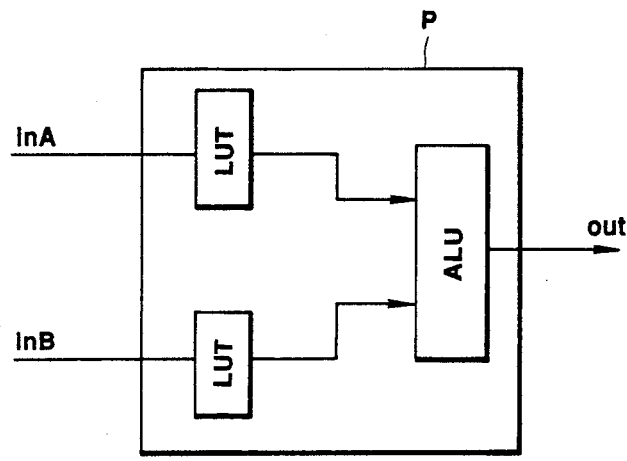
FIG. 2 is a circuit block diagram of an example of a processor used in the image processing system shown in FIG. 1.

It is noted that, as shown in FIG. 2, each or any one of the processors $P_1$ to $P_n$ generally represented by P includes LUTs (Look Up Table) receiving data via their input ends in A and in B and carrying out function transformations such as constant multiplications, sin, and cosine and an ALU (Arithmetic Logic Operation Unit) carrying out an addition, substration, and logic operations via the LUTs. It is noted that a write (initialization) into each LUT is carried out by means of a host computer (not shown). The ALU is a portion of a hardware of each processor in which arithmetic and logical operations are performed and generally includes an accumulator, some special registers for the storage of operands and results, supplemented by shifting and sequencing circuitry for implementing multiplication, division, and other desired operations. Each LUT is defined as a collection of data in a form suitable for ready reference, frequently as stored in sequenced machine locations or written in the form of an array of rows and columns for easy entry, and in which an intersection of labeled rows and columns serve to locate a specific piece of data or information.

In FIG. 1, a VRAM controller 21 performs a whole control for the selectors $S_1$ to $S_m$ in addition to its function to read and write controls of each image memory VRAM 1 to VRAM m. The read and write controls by means of the VRAM controller 21 is independently carried out for each image memory VRAM 1 to VRAM m. For example, the VRAM 1 is set in a read mode while the VRAM m is set in a write mode. In FIG. 1, numerals 22 and 23 denote address controller for controlling addresses on the address buses X and Y and controller controlling the processors $P_1$ to $P_n$ and address controller 22, respectively.

The whole image processing system is controlled by means of the host computer. However, the host computer is not shown in the drawings for simplicity.

Figure 3:
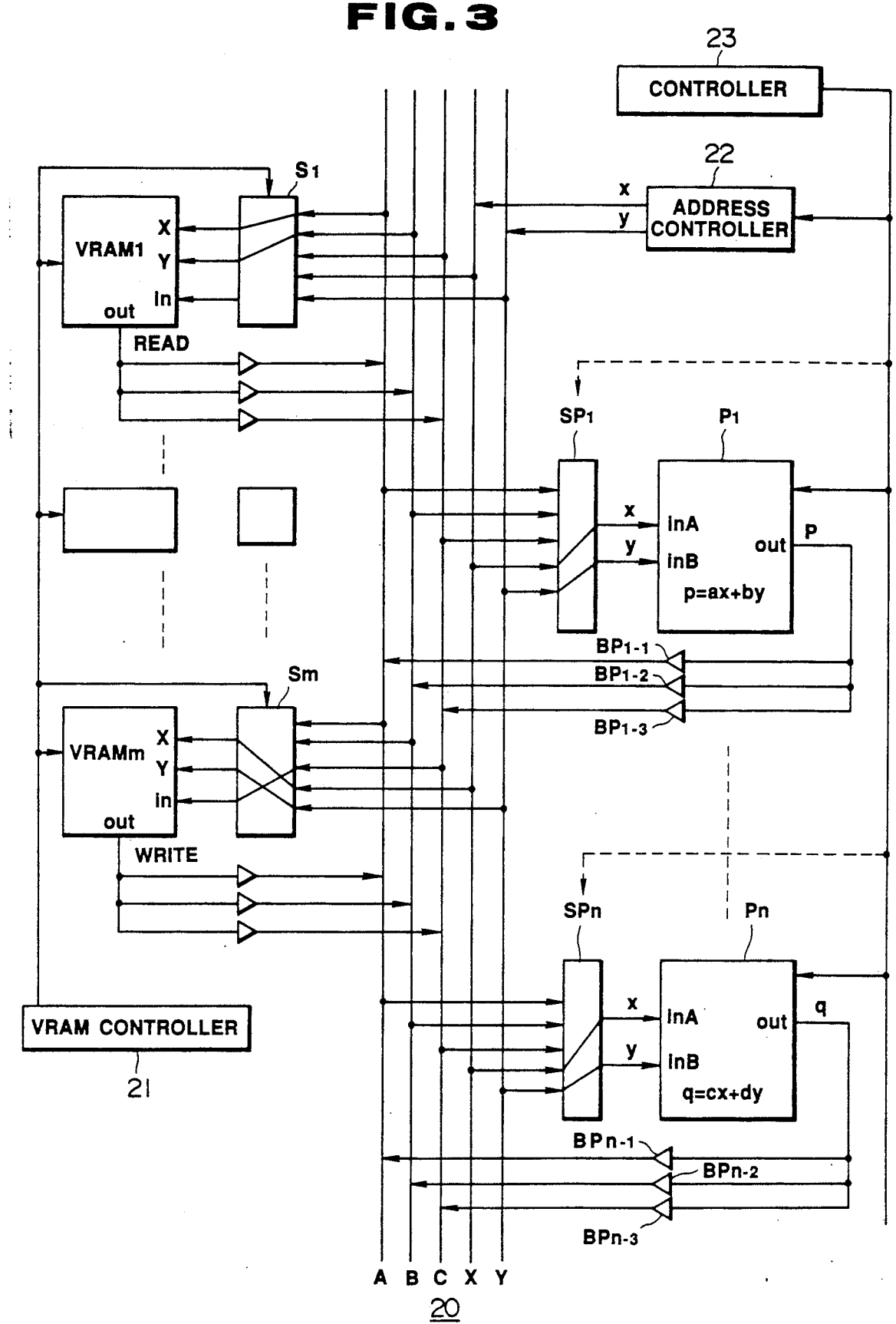
FIG. 3 is a circuit block diagram of the image processing system for explaining an operation of the image processing system shown in FIG. 1.

An operation of the image processing system shown in FIG. 1 in a case of an affine transformation will be described with reference to FIGS. 1 to 3.

Suppose that the affine transformation is carried out on the basis of data stored in one of the image memories, i.e., VRAM 1 in which an original image data (before under the affine transformation) is stored and that a data subjected to the affine transformation is to be stored into the other image memory VRAM m.

In this case, the image memory VRAM 1 is set in the read state by the VRAM controller 21. The data bus A is selected to input x address data into the X address of the VRAM 1 via the selector $S_1$ and data bus B is selected to input y address data into the Y address of the VRAM 1 via the same selector $S_1$. Addresses p and q (to be described later) are outputted to the data buses A and B from the processors $P_1$ and $P_n$, respectively. The image data stored in the image memory VRAM 1 is outputted to the remaining data bus C.

On the other hand, the image memory VRAM m is set in the write state by the VRAM controller 21. The address bus X is selected as the x address for the processors $P_1$ and $P_n$ and the address bus Y is selected as the y address for the processors $P_1$ and $P_n$ via the selectors $SP_1$ and $SP_n$. The image memory VRAM m inputs the x and y addresses transmitted via the address controller 22. The data bus C is selected as the input bus of the image data to enable input of data from the image memory VRAM 1 to VRAM m.

The (x, y) addresses transmitted from the address controller 22 are inputted via the address bus X and address bus Y into the corresponding processors $P_1$ and $P_n$, respectively. Each processor $P_1$ and $P_n$ carries out the constant multiplication in the LUTs (Look-Up Tables) and carries out the addition calculation through the ALUs in the following equations.

$$P = ax + by$$

$$q = cx + dy$$

The constants a, b, c, and d are constants corresponding numerically to a rotation angle of the image in the affine transformation. In addition, x and y in the above equations indicate addresses after the image rotation outputted from the address controller 22 and serve as addresses of the above-described image memory VRAM m. In addition, p and q in the above equation denote addresses of the original image corresponding to those x and y after the image rotation; i.e., serve as the addresses of the image memory VRAM 1. The processed output of the processor $P_1$, i.e., address p is inputted into the image memory VRAM 1 via the data bus A. The processed output of the processor $P_n$, i.e., address q is transmitted into the VRAM 1 via the data bus B. The image memory VRAM 1, then, outputs the image data to the data bus C on the basis of the addresses p and q. Since the image data derived from the image memory VRAM 1 is stored in the VRAM m, the data transfer is possible between different addresses in the image processing system shown in FIGS. 1 to 3. It is noted that when the address controller 22 controls addresses of the image data to scan over one image screen (one frame), one sheet of rotational image is stored into the VRAM m and the processing of the one rotation image is ended.

Although in the above-described first embodiment the affine transformation (rotation of a figure) has been described, the extension of the processors and image memories can easily be achieved (the installed number of processors and image memories can be increased) in the bus structure of the system described above. If the number of common buses is increased, complex parallel runs of processings can consequently be achieved and high-speed processings can be achieved.

Figure 4:
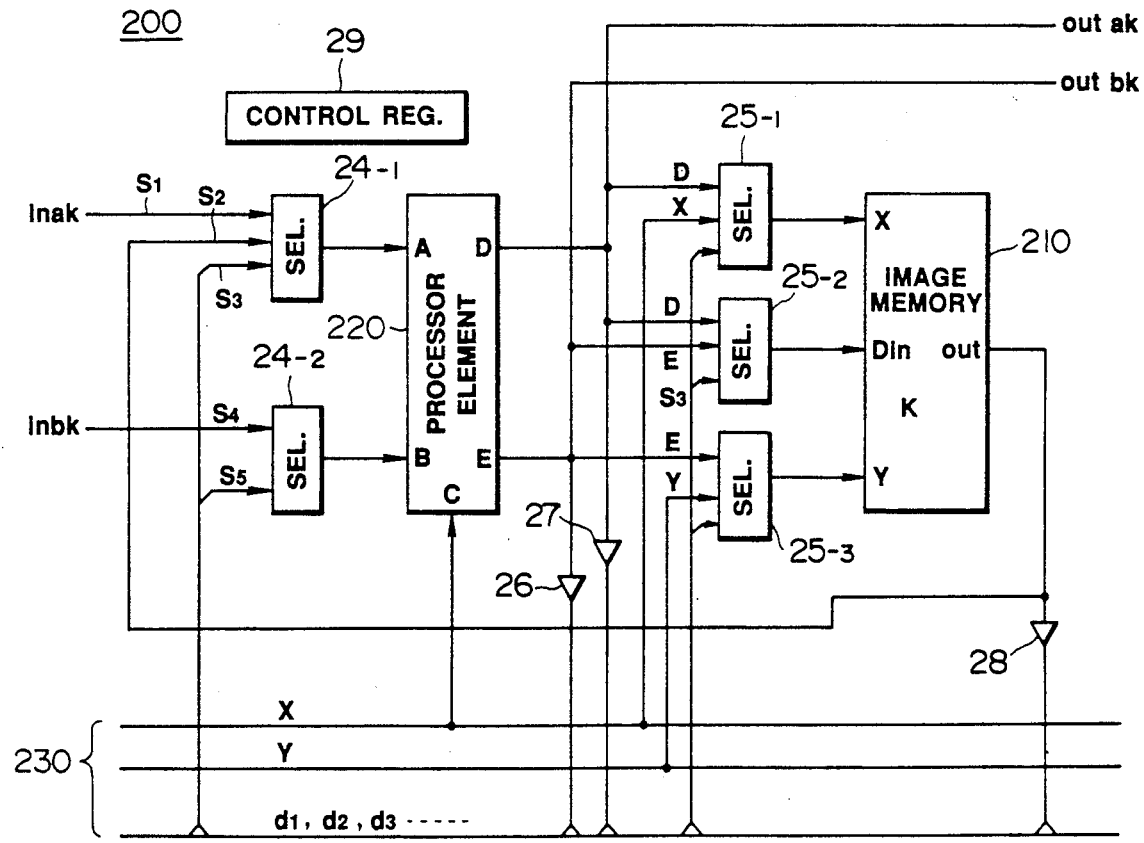
FIG. 4 is a circuit block diagram of the image processing system in a second preferred embodiment according to the present invention.

FIG. 4 shows an example of an image processing system in a second preferred embodiment according to the present invention.

In FIG. 4, an image memory 210 stores image data. A processor element 220 is provided for calculating predetermined series of calculations on the basis of inputted image data. A common bus 230 includes address buses of X address and Y address and data bus constituted by a plurality of bus lines $d_1$ to $d_n$.

In the second preferred embodiment shown in FIG. 4, one image processing portion 200 is constituted by a pair of a single processor element 220 and a single image memory 210. Selectors $24_{-1}$ and $24_{-2}$ carry out selections of any one input data to the processor element 220. Selectors 25 ($25_{-1}$, $25_{-2}$, $25_{-3}$) select any one of input lines to input addresses and data into the image memory 210 as will be described later.

The selector $24_{-1}$ selects any one of three signals, i.e., a signal $S_1$ derived from the other processor element via an input line inak, an output signal $S_2$ of the image memory 210 which couples with the selector $24_{-1}$, and a signal $S_3$ on any one of the data buses $d_1$, $d_2$, $d_3$, - - - to be inputted to the processor element 220.

The selector $24_{-2}$ selects any one of two signals, i.e., a signal $S_4$ derived from the other processor element (not shown in FIG. 4) via an input line inbk and a signal $S_5$ derived from any one of the data buses $d_1$, $d_2$, $d_3$, - - - and inputs the selected signal into the processor element 220 via an input end B. In addition, the output data of the processor element 220 are transmitted to the data bus $d_1$, $d_2$, $d_3$, - - - via output buffers 26 and 27, to the selectors 25 ($25_{-1}$, $25_{-2}$, $25_{-3}$), and to the other processor element via output lines out ak and out bk.

On the other hand, the selector $25_{-1}$ selects any one signal from among the D output of the processor element 220, X address bus, and the signal $S_3$ on any one of the data buses $d_1$, $d_2$, $d_3$, - - - to an X address of the image memory 210. The selector $25_{-2}$ selects any one of signals from the D output, E output, and the signal $S_3$ of the data buses $d_1$, $d_2$, $d_3$, - - - to be inputted into the image memory 210 via data input end Din. The selector $25_{-3}$ selects any one of the signals from among the signals $S_3$ of the E output, Y address bus, and data buses $d_1$, $d_2$, $d_3$, - - - to be inputted into the Y address of the image memory 210.

The output image data derived from the image memory 210 is transmitted to the selector $24_{-1}$ and to any one of the data buses $d_1$, $d_2$, $d_3$, - - - via an output buffer 28.

It is noted that an integrated control for all of the selectors 24, 25 and output buffers 26, 27, and 28 are carried out by writing instructions issued from the host computer on a control register 29.

Figure 5:
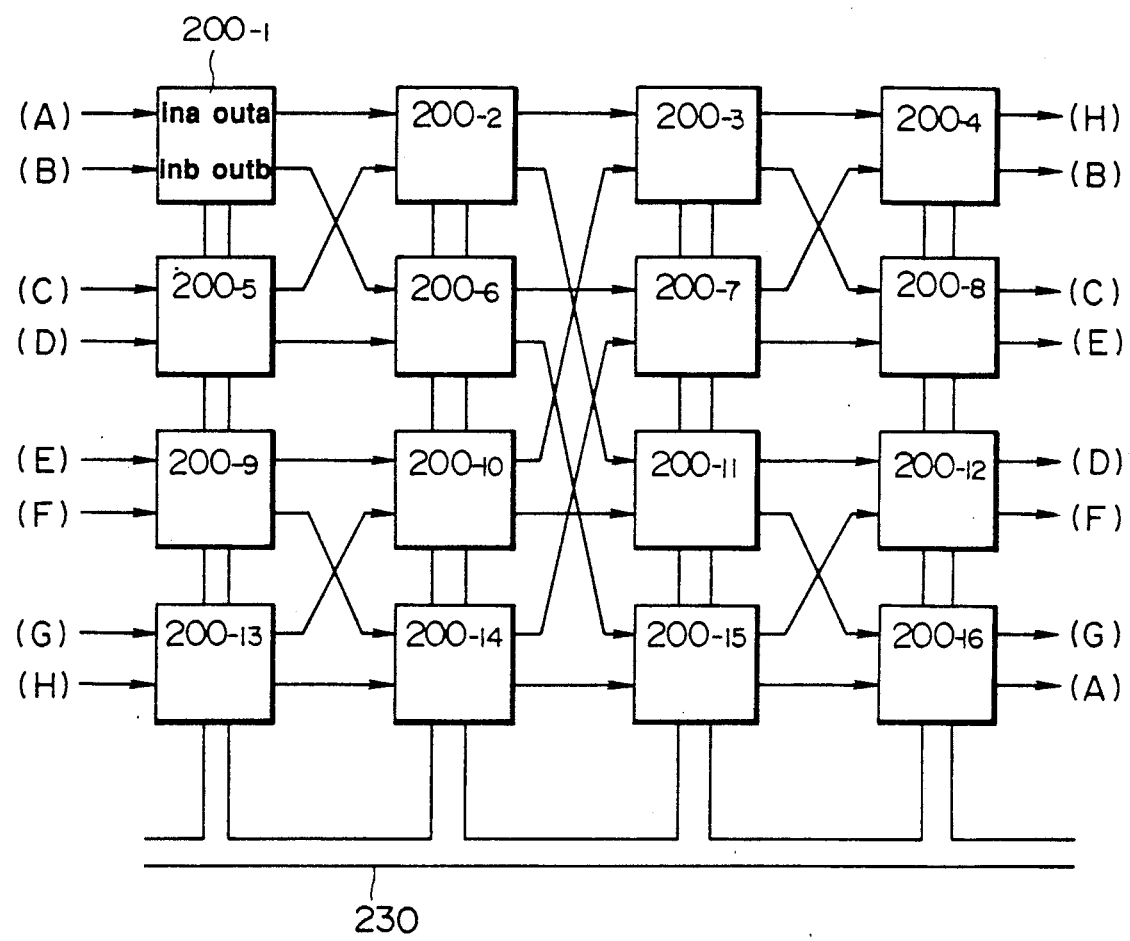
FIG. 5 is a circuit block diagram of a connection example of image processing portions in the image processing system.

FIG. 5 shows a plurality of pairs of image processing portions 200, each image processing portion 200 constituted as shown in FIG. 4.

The output signal of one of the processor elements 220 in each image processing portion 200 is inputted into the other one of the processor elements 220 of one of the other processing portions 200 (actually via its selector 24). As shown in FIG. 5, the common bus 230 and each image processing portion 200 is interconnected. The common bus 230 is a self-contained bus common to each image processing portion 200.

In the second preferred embodiment, the output of two upper and lower image processing portions 200 is inputted into the two adjacent upper and lower image processing portion 200 (e.g., 200-1, 200-5, 200-2, and 200-6). Therefore, four pairs of the image processing portions 200 constitute a single block. Furthermore, the outputs of the two upper and lower blocks are inputted into the adjacent upper and lower blocks.

Figure 6:
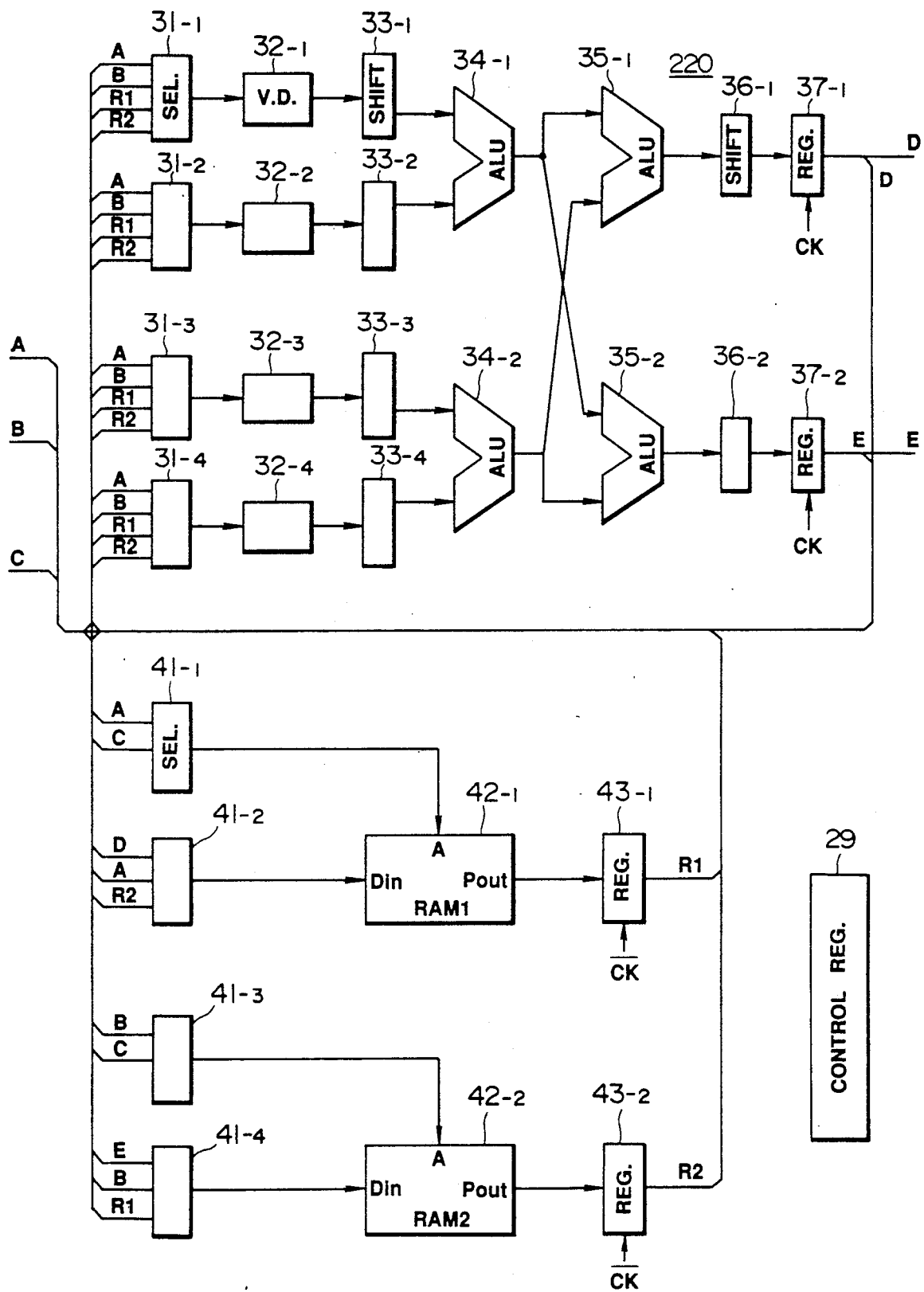
FIG. 6 is a circuit block diagram of an example of a processor element shown in FIG. 4 used in the image processing system in the second preferred embodiment.

FIG. 6 shows an internal structure of the processor element 220 shown in FIG. 4.

As shown in FIG. 6, at least two input lines A and B and auxiliary input line C are provided and two output lines D and E are provided in the processor element 220. The processor element 220 includes four ALUs (Arithmetic/Logic operation Unit) $34_{-1}$, $34_{-2}$, $35_{-1}$, $35_{-2}$.

Input ports of first stages of ALUs 34 are connected to selectors 31, variable delays 32, and shifters 33 in series with each other. Two RAMs 42 are provided, each RAM 42 ($42_{-1}$, $42_{-2}$) having a capacity exceeding P words. It is noted that $P=2^L$, P denotes the number of longitudinal (Y axis) and horizontal (X axis) pixels (256 (L=8), 512 (L=9), and so on) of the image memory 210, L is matched with the number of arithmetic operation bits of an input/output bus thereof and ALU (8, 9 and so on).

On the other hand, the selectors 31 ($31_{-1}$ to $31_{-4}$) select independently one of the input ends A and B, and one of the outputs $R_1$ and $R_2$ of the RAMs 42. The variable delays 32 ($32_{-1}$ to $32_{-4}$) can select the number of delays from 0 to 7 clocks (0D to 7D) of delays. One clock delay means a delay of one horizontal direction. Arithmetic shifters 33 ($33_{-1}$ to $33_{-4}$) carry out arithmetic shifts of input quantities of data by once, twice, $\frac{1}{2}$, $\frac{1}{4}$ and so on. Each shifter 33 multiplies or divides an input digital quantity by a power of the number base.

A second stage of ALUs 35 ($35_{-1}$, $35_{-2}$) is connected with shifters 36 ($36_{-1}$, $36_{-2}$) and registers 37 ($37_{-1}$, $37_{-2}$). The shifters 36 corrects an overflow of the corresponding ALUs 35. The registers 37 are used as pipeline registers.

In addition, as shown in FIG. 6, input selections to the RAMs 42 are carried out by means of selectors 41. That is to say, an input to an address input end A of the RAM ($42_{-1}$) is selected from one of the input lines A and C. Data input to a data input end Din of the RAM ($42_{-1}$) is selected from any one of the output D of the register $37_{-1}$, input line A, and output R2 of the RAM ($42_{-2}$) by means of the selector $41_{-2}$.

On the other hand, the input to an address input end A of the RAM ($42_{-2}$) is selected from any one of the input lines B and C by means of the selector ($41_{-3}$). The data input to the data input end Din of the RAM ($42_{-2}$) is selected from any one of the output E of the register ($37_{-2}$), input B, and output R1 of the RAM ($42_{-1}$) by means of the selector ($41_{-4}$). The read outputs of the RAMs 42 are inputted into respective registers 43.

Each RAM 42 is operated to read data at one prior half of clocks ck and to write data at one last half of clocks ck. A latch to each register 43 is carried out during an end of the prior half of the clocks ck.

The whole processor element 220 is controlled through instructions stored in a control register 29. Dependent on a value of the control register 29, instructions are transmitted to the selectors 31 and 41 and ALUs 34 and 35. Once one of the instructions is set in the control register 29, the same processings are repeatedly processed provided that the input data is supplied in synchronization with the clocks ck.

It is noted that the RAMs 42 can be used as LUTs or can be used as one line delay (one line delay means a delay by a longitudinal delay corresponding to one horizontal scan of the pixels). In a case where the RAMs 42 are used as LUTs, the contents to be processed are previously written into the RAMs 42 by means of the host computer. During its processing, the input line A is selected into the address input end A of each RAM $42_{-1}$ and $42_{-2}$. Then, the LUT outputs can be achieved as the output of RAMs 42.

On the other hand, if the RAMs 42 are used as the one line delay component, input line C receives a horizontal (X) address of the other image memory 210 and is incremented for each pixel. The input line A is selected to be inputted into the data input end ($D_{in}$) and the RAMs 42 reads at the prior half of the clocks ck and writes the last half of the clocks ck. In this way, the data prior to one longitudinal line are outputted from the corresponding register 43.

Next, an operation of the image processing system in the second preferred embodiment shown in FIGS. 4 to 6 will be described below with reference to FIGS. 7 to 8 (B).

Suppose that longitudinal (Y-directional) and lateral (X-directional) edges of a graphic display are simultaneously derived through a 3×3 (window space) spatial filtering and stored in one of the memories 210.

Then, suppose that a central pixel is represented by $X_{i,j}$, the longitudinal edge is represented by $V_{i,j}$, and the lateral edge is represented by $H_{i,j}$.

The four processor elements 220 are used to calculate the following equations, as shown in FIG. 8(A) and FIG. 8(B). A processing route is appreciated from FIG. 7. However, other connections of lines not directly related to the processings described below are omitted for ease of explanation.

$$V_{ij} = X_{i+1,j-1} + X_{i+1,j} + X_{i+1,j+1} - $$
$$(X_{i-1,j-1} + X_{i-1,j} + X_{i-1,j+1})$$
$$H_{ij} = X_{i-1,j-1} + X_{i,j+1} + X_{i+1,j+1} - $$
$$(X_{i-1,j-1} + X_{i,j-1} + X_{i-1,j-1})$$

The original image is read out of an arbitrary image memory. Results of processings are stored into the image memories 210 related to the processor elements ($22_{-3}$) and ($22_{-4}$).

It is noted that the original image and processed image are scanned over one frame by scanning both images in the lateral direction (X address direction). That is to say, X address bus lines and Y address bus lines of the common bus 230 are inputted into the X and Y addresses of the image memories 210 and the image data are outputted to the data buses $d_1$, $d_2$, $d_3$, ---.

An example of calculation procedure of 3×3 spatial filtering in each processor element 220 ($22_{-1}$, $22_{-2}$, $22_{-3}$, and $22_{-4}$) will be described below.

One line delay and two line delay are provided through passages of the two RAMs 42 ($42_{-1}$ and $42_{-2}$) of the processor elements ($22_{-1}$) and ($22_{-2}$).

At this time, x address bus (CX in FIG. 7 and X in FIG. 4) is selected for each RAM $42_{-1}$ and $42_{-2}$ in the processor elements $22_{-1}$ and $22_{-2}$ by means of the respective registers $41_{-1}$ and $41_{-3}$.

Then, the register $41_{-2}$ selects data of the original image as the input of data Din to the RAM $42_{-1}$. Furthermore, the data R1 delayed by one scan line through the RAM $42_{-1}$ is selected by means of the register $41_{-4}$.

Figure 7:
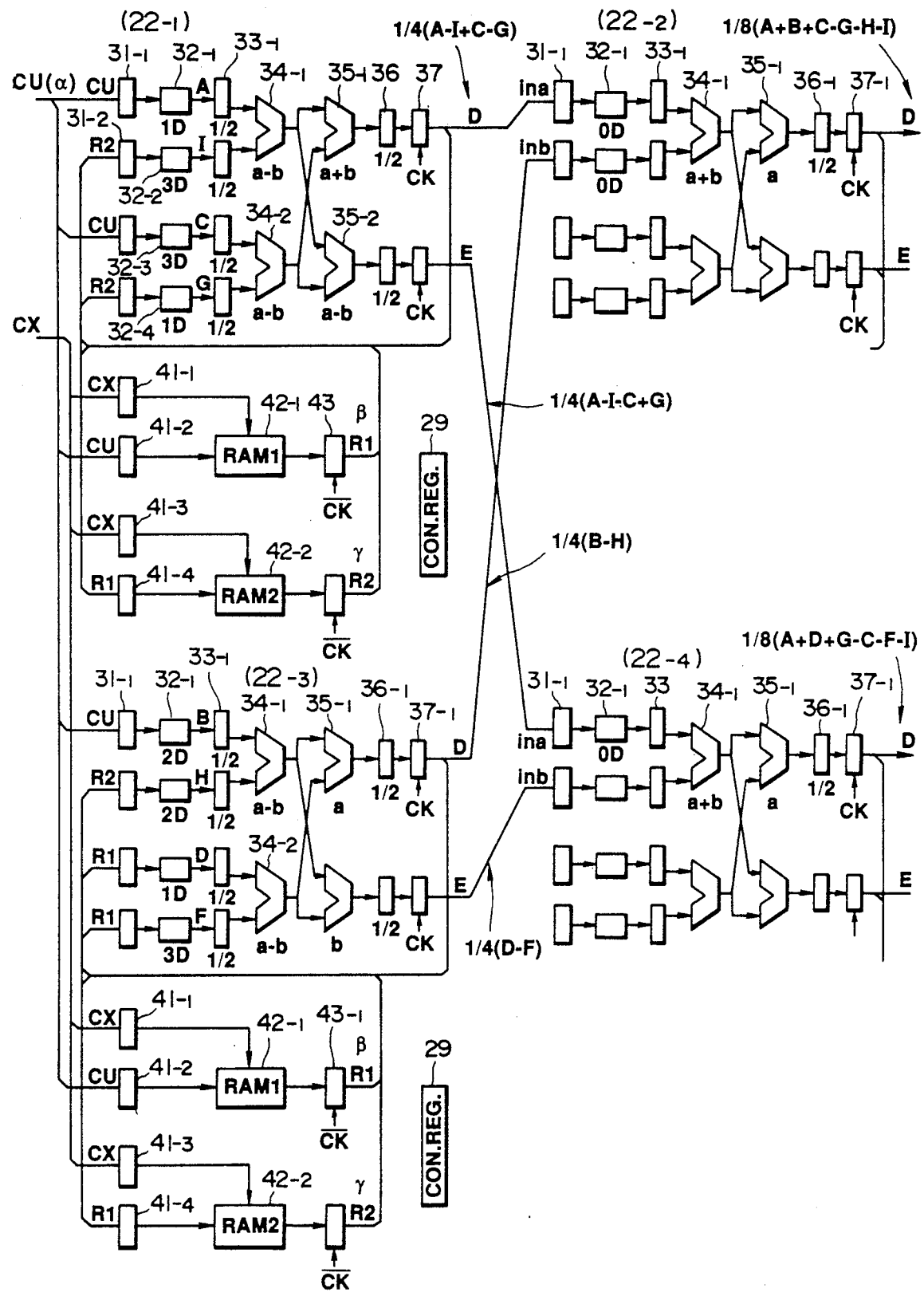
FIG. 7 is a circuit block diagram of the image processing system for explaining an operation of the image processing system shown in FIG. 5.

Suppose that the image data is scanned and that, at a certain time, the pixel ALPHA ($X_{i+2,j+1}$) is inputted through the data bus denoted by CU in FIG. 7, the outputs R1 of the RAMs $42_{-1}$ indicate BETA ($X_{i+2,j}$) and the outputs R2 of the RAMs $42_{-2}$ indicates GAMMA ($X_{i+2,j-1}$) (refer to FIG. 8(B) since one one line delay is provided by the upper RAM $42_{-1}$.

In addition, the upper processor element $22_{-1}$ inputs the input image data ALPHA ($X_{i+2,j+1}$) by means of the selector $31_{-1}$ and data R2, i.e., GAMMA ($X_{i+2,j-1}$) through the register $31_{-2}$.

The variable delay $32_{-1}$ is used to provide one-clock delay (1D) to derive a pixel data I as shown in FIG. 7, the other variable delay $32_{-3}$ is used to provide three-clock delay (3D) to derive a pixel data C, and the other variable delay $32_{-4}$ is used to provide one-clock delay (1D) to derive a pixel data G. The one-clock delay means one horizontal delay corresponding to a shift by one position. The shifters 33 ($33_{-1}$ to $33_{-4}$) to prevent an overflow of data from the adjacent ALUs are used to multiply all input values of the image data by ½. Then, the ALU ($35_{-1}$) is used to execute the addition calculation (a+b).

The ALU ($35_{-2}$) is used to execute a subtraction (a−b). The shifters 36 are used to multiply input values of the image data by ½ and the output values thereof are once latched. After the above-described processing is ended, the processor element ($22_{-1}$) provides the following outputs denoted by D and E.

$$D = \tfrac{1}{4}(A - I + C - G)$$

$$E = \tfrac{1}{4}(A - I - C + G)$$

It is noted that the ALUs $34_{-1}$, $34_{-2}$, and $35_{-2}$ carry out subtractions (a−b).

The output values D and E are transferred to input ends ina of the processor elements ($22_{-2}$) and ($22_{-4}$).

On the other hand, in the lower processor element ($22_{-2}$), the selectors ($31_{-1}$), ($31_{-2}$), ($31_{-3}$), and ($31_{-4}$) receive pixel data ALPHA, output GAMMA of R2, output BETA of R2, and output BETA of R1. The variable delays ($32_{-1}$), ($32_{-2}$), ($32_{-3}$), and ($32_{-4}$) are set to two-clock delay (2D), 2 delay (2D), 1 delay (1D), and 3 delay (3D) to output pixel data B, H, D, and F. Each multiplied value of the shifters 33 is set to ½. The ALU 34 carries out the subtraction processing (a−b) of the input values. In addition, the ALU $35_{-1}$ outputs directly the subtraction result (a) of the ALU ($34_{-2}$). Each ALU value is multiplied by ½ by means of the shifters 36, respectively. In addition, the registers 37 once latch the incoming data. After the above-described processing, the outputs D and E of the registers 37 indicate the following.

$D = \frac{1}{2}(B-H)$ $E = \frac{1}{2}(D-F)$.

The outputs D and E of the registers 37 are transferred into input ends inb of the cross connected processor elements ($22_{-2}$) and ($22_{-4}$).

Next, the processor element ($22_{-3}$) inputs data on the lines ina and inb. The ALU ($34_{-1}$) in the processor element $22_{-2}$ carries out an addition processing (a+b) without delay (0D) and the shifters $32_{-1}$ and $32_{-2}$ multiply once (0D). The addition result causes the ALU ($35_{-1}$) to directly be passed. After the shifter ($36_{-1}$) multiplies the addition result of the ALU $34_{-1}$ by ½, the multiplied addition result is supplied to an input end $D_{in}$ of the successive stage of the image memory $210_{-3}$ (not shown). The output D from the register $37_{-1}$ indicates - - - D = ⅛ (A+B+C−H−I).

This value D means the lateral edge.

On the other hand, the same processing is carried out in the processor element ($22_{-4}$). That is to say, in the processor element ($22_{-4}$), the ALU ($34_{-1}$) carries out the addition processing without delay (0D) and the shifter $32_{-1}$ multiplying once (1D), with data on the input lines ina and inb being inputted through the registers $31_{-1}$ and $31_{-2}$. The result of addition processing is directly outputted from the ALU $35_{-1}$ and the value thereof is multiplied by ½ by the shifter $36_{-1}$. Then, the multiplied addition result is outputted to the register $37_{-1}$. The output result of D from the register ($37_{-1}$) indicates D = ⅛ (A+D+G−C−F−I).

This value D means the longitudinal edge.

Consequently, two kinds of 3×3 spatial filterings are simultaneously executed. If the multiple number of the image processing portions 200 constituted by the processor elements 220 and image memories 210 are actually mounted as shown in FIG. 5, the entirely different processings can simultaneously be executed in the respective image processing portion 200. In addition to 3×3 filterings, the other variety of filterings of 5×5, 1×8, 8×1, and 3×5, affine transformations, and Hough transformations can be executed using effectively the processor elements.

It is noted that both the image memories and processor elements correspond to each other. However, it is not necessary to match the number of the processor elements with those of the image memories. The mounting of unneccesary image memories may be omitted.

Furthermore, if the outputs of the processor elements 220 are selected through the X address and Y address of the image memories 210 and the result of calculations such as X/Y is stored into the image memory 210, the image memory 210 can be used as two-dimensional LUTs.

As described hereinabove, since in the image processing system according to the present invention selectors are generally provided between the common bus and image memories (VRAMs) and between the common bus and processors (processor elements), the data transfer between different addresses becomes possible and parallel run of different processings between different coordinates becomes possible. Furthermore, the extension of image memories and processors (processor elements) can be facilitated. In addition, general-purpose utilities and high-speed processings can be achieved.

It will fully be appreciated by those skilled in the art that the foregoing description is made in terms of the preferred embodiments and various changes and modifications may be made without departing from the scope of the present invention which is to be defined by the appended claims.

What is claimed is:

1. A structure of an image processing system, comprising:
   (a) a common bus having at least two address bus lines and at least one data bus line;
   (b) a plurality of image memories each image memory capable of storing input image data and including two address input ends, data input end, and an output end;
   (c) a plurality of data processors capable of processing input image data to execute predetermined calculations and outputting executed data to the common bus, each data processor having at least two input ends and at least one output end connected to the common bus;
   (d) a plurality of selectors connected between each bus line of the common bus and each input end of the image memories and connected between each bus line of the common bus and each input end of the data processors, each selector capable of selecting at least any one of the respective bus lines to connect to the corresponding input end of the image memories and the data processors; and
   (e) first means for controlling the image memories, data processors, and the selectors independently of each other so that a transfer of image data between different addresses of the image memories becomes possible for each image frame.

2. A structure as set forth in claim 1, wherein the common bus has two lateral and longitudinal address bus lines and three data bus lines and each selector associated with the image memories and the data processors has five input ends connected with the respective bus lines of the common bus.

3. A structure as set forth in claim 2, wherein each selector associated with the corresponding image memory has three output ends connected to lateral, longitudinal, and data input ends of the corresponding image memory, and each image memory has one output end connected to the three data bus lines of the common bus via a corresponding output buffer, and each data processor has the one output end connected to the three data bus lines via a corresponding buffer.

4. A structure as set forth in claim 3, wherein the first means includes:
   (a) second means for setting a first image memory of the image memories in a read mode while setting a second image memory in a write mode; and
   (b) third means for producing and outputting lateral and longitudinal addresses sequentially for each image frame to the lateral and longitudinal address bus lines of the common bus.

5. A structure as set forth in claim 4, wherein the selectors associated with first and second data processors of the data processors are operated to select the two address bus lines to input lateral and longitudinal addresses to the corresponding address input ends of the first and second data processors, one of the selectors associated with the first image memory set in the read mode is operated to select two of the three data bus lines of the common bus to input the executed data from the first and second data processors into the lateral and longitudinal address input ends of the first memory, and the other one of the selectors associated with the second image memory in the write mode is operated to select the two address bus lines to input the lateral and longitudinal address data into the corresponding address input ends of the second image memory and select the remaining data bus line to input the read data from the first image memory into the data input end of the second image memory.

6. A structure as set forth in claim 5, wherein the first data processor calculates as follows:
p = ax + by, wherein x and y denote lateral and longitudinal addresses after a rotation of figure of the image under an affine transformation, p denotes the lateral address before the rotation of figure, and a and b denote constants corresponding to an angle of the rotation, and the second data processor calculates as follows:
q = cx + dy, wherein q denotes the longitudinal address before the rotation of figure under the affine transformation and c and d denot constants corresponding to the angle of rotation.

7. A structure as set forth in claim 6, wherein the executed data from the first data processor is transmitted to the lateral address input end of the first image memory via the corresponding output buffer and a first data bus line of the three data bus lines of the common bus, the executed data from the second data processor is transmitted to the longitudinal address input end of the first image memory via the corresponding output buffer and a second data bus line of the three data bus lines of the common bus, and the read data from the first image memory is transmitted to the data input end of the second memory via the corresponding output buffer of the first image memory, a third data bus line of the common bus and the selector associated with the second image memory.

8. A structure as set forth in claim 6, wherein each of the first and second data processors includes two LUTs (Look-Up Tables) and an ALU (Arithmetic/Logical Operation Unit).

9. A structure as set forth in claim 1, wherein each image memory includes a VRAM (Video Random Access Memory).

10. A structure as set forth in claim 1, which further comprises an exclusive bus for providing a connecting means between one of the data processors and at least one image memory for constituting a pair of the data processor and image memory, so that the system has a plurality of image processing portions constituted by the pairs thereof.

11. A structure as set forth in claim 10, wherein the selectors are installed in the system so as to associate with the respective image memories for selecting at least any one of signals derived from the common bus and form output signals of the data processors constituting the respective pairs with the corresponding image memories as address data inputs and data inputs of the respectively associated image memories and the selectors are installed in the system so as to associate with the respective data processors for selecting at least any one of output data signals of the respective image memories constituting the respective pairs with the corresponding data processors, transmitted signals on the common bus, and output signals derived from any one of the other data processors via the exclusive bus as data inputs of the respectively associated data processors.

12. A structure as set forth in claim 11, wherein each image processing portion includes a first selector connected between a first data bus line (inak) of the exclusive bus connected to the adjacent one of the other image processing portions, the output end of the corresponding image memory, and a plurality of data bus lines of the common bus and a first data input end of the associated data processor, a second selector connected between a second data bus line (inbk) of the exclusive bus connected to the adjacent one of the other image data processing portions, and the data bus lines of the common bus and a second input data input end of the data processor.

13. A structure as set forth, in claim 12, wherein each image processing portion includes a third selector connected between a first data output end of the corresponding data processor, a lateral address bus line of the common bus, and the data bus lines of the common bus and a lateral address input end of the associated image memory, a second selector connected between the first output end of the corresponding data processor, the second data output end thereof, and data bus lines of the common bus and data input end of the image memory, and a third selector connected between the second output end of the corresponding data processor, a longitudinal address bus line of the common bus, and data bus lines of the common bus and a longitudinal address input end of the image memory.

14. A structure as set forth in claim 13, wherein an address input end of the data processor is directly connected to a lateral address bus line of the common bus, data output ends of the data processor are connected to the data bus lines of the common bus via output buffers, and the output end of the image memory is connected to the data bus lines via an output buffer.

15. A structure as set forth in claim 14, wherein one of the output signals of the data processor at the first output end thereof in one of the image processing portions is transmitted to a right upper side one of the image processing portions via the exclusive bus and the other output signal of the data processor at the second output end is transmitted to a right lower side one of the image processing portions so that the four of the mutually adjacent image processing portions constitute one of image processing blocks.

16. A structure as set forth in claim 15, wherein each data processor includes four sixth selectors, four variable delays, four first shifters, four cross-connected ALUs, two second shifters, and two first output registers, each of the sixth selectors being connected between two internal bus lines of the corresponding data selector and an input end of the corresponding variable delay, each variable delay for delaying its input data by a predetermined lateral positional delay quantity being connected between an output end of the corresponding sixth selector and an input end of the corresponding first shifter, each second shifter being connected between an output end of the corresponding one of the four ALUs and an input end of the corresponding first register, and each data selector further includes four seventh selectors, two RAMs, and two second output registers, a first of the seventh selectors being connected between an output end of the corresponding first selector and the lateral address bus line of the common bus and an address input end of a first one of the two RAMs, a second of the seventh selectors being connected between one of the first registers via the first data output bus line of the exclusive bus, the first data input bus line of the exclusive bus, and a second internal bus line connected to one of the second output registers and a data input end of the first RAM, a third of the seventh selectors being connected between the output end of the second selector and lateral address bus line of the common bus and an address input end of the second RAM, a fourth of the seventh selectors being connected between an output end of a second one of the first registers via the data output line of the exclusive bus, the output end of the second selector, and the first internal bus and a data input end of the second RAM, and each second register being connected between the corresponding output end of each RAM and the corresponding first and second internal bus lines.

17. A structure as set forth in claim 16, wherein the one of the image processing block carries out a $3 \times 3$ spatial filtering and derives a lateral and longitudinal edges thereat.

18. A structure as set forth in claim 17, wherein the two RAMs serve as longitudinal delays for delaying input data by predetermined same longitudinal positional delay quantities.

19. A structure as set forth in claim 18, wherein the first data output bus line (D) of the first image processing portion indicates $\frac{1}{4}(A-I+C-G)$, the second data output bus line (E) of the first image processing portion indicates $\frac{1}{4}(A-I-C+G)$, the first data output bus line of the second image processing portion indicates $\frac{1}{4}(B-H)$, the second data output bus line of the second image processing portion indicates $\frac{1}{4}(D-F)$, the first data output bus line of the third image processing portion indicates $\frac{1}{8}(A+B+C-G-H-I)$ which means the lateral edge, and the first data output bus line of the fourth image processing portion indicates $\frac{1}{8}(A+D+G-C-F-I)$ which means the longitudinal edge, wherein A denotes $X_{i+1,j+1}$, B denotes $X_{i,j+1}$, C denotes $X_{i-1,j+1}$, D denotes $X_{i+1,j}$, E denotes $X_{i,j}$ which indicates a center pixel, F denotes $X_{i-1,j}$, G denotes $X_{i+1,j-1}$, H denotes $X_{i,j-1}$, and I denotes $X_{i-1,j-1}$ and X denotes the address of each pixel.

20. A structure of an image processing system, comprising:
(a) first means provided for commonly connecting each system component to transmit each address information and image data;
(b) second means associated with the first means for storing address information and related image data transmitted via the first means;
(c) third means associated with the first means for receiving address information and image data and processing the received address information and image data which are returned to the first means;
(d) fourth means associated between the first means and second means for selectively inputting address information and image data into the second means;
(e) fifth means associated between the first means and third means for selectively inputting the address information and image data into the third means; and
(f) sixth means for controlling the second, third, fourth, and fifth means independently of each other so that a transfer of image data between different addresses becomes possible for each image frame.

21. A structure as set forth in claim 20, which further comprises seventh means for controlling the second, third, fourth, and fifth means independenly of each other so that simultaneous executions of processings by the third means becomes possible.

* * * * *